Patented Aug. 7, 1951

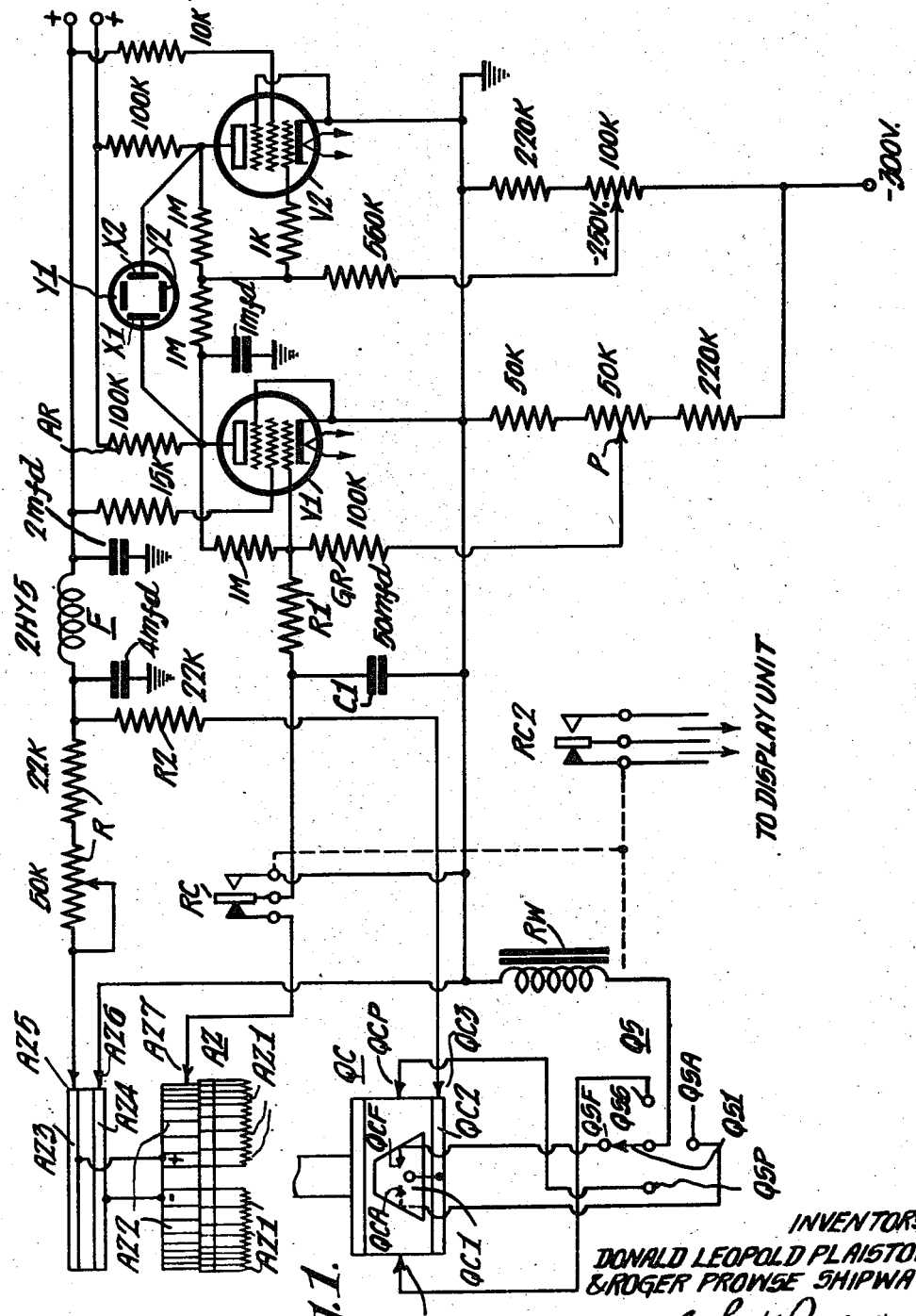

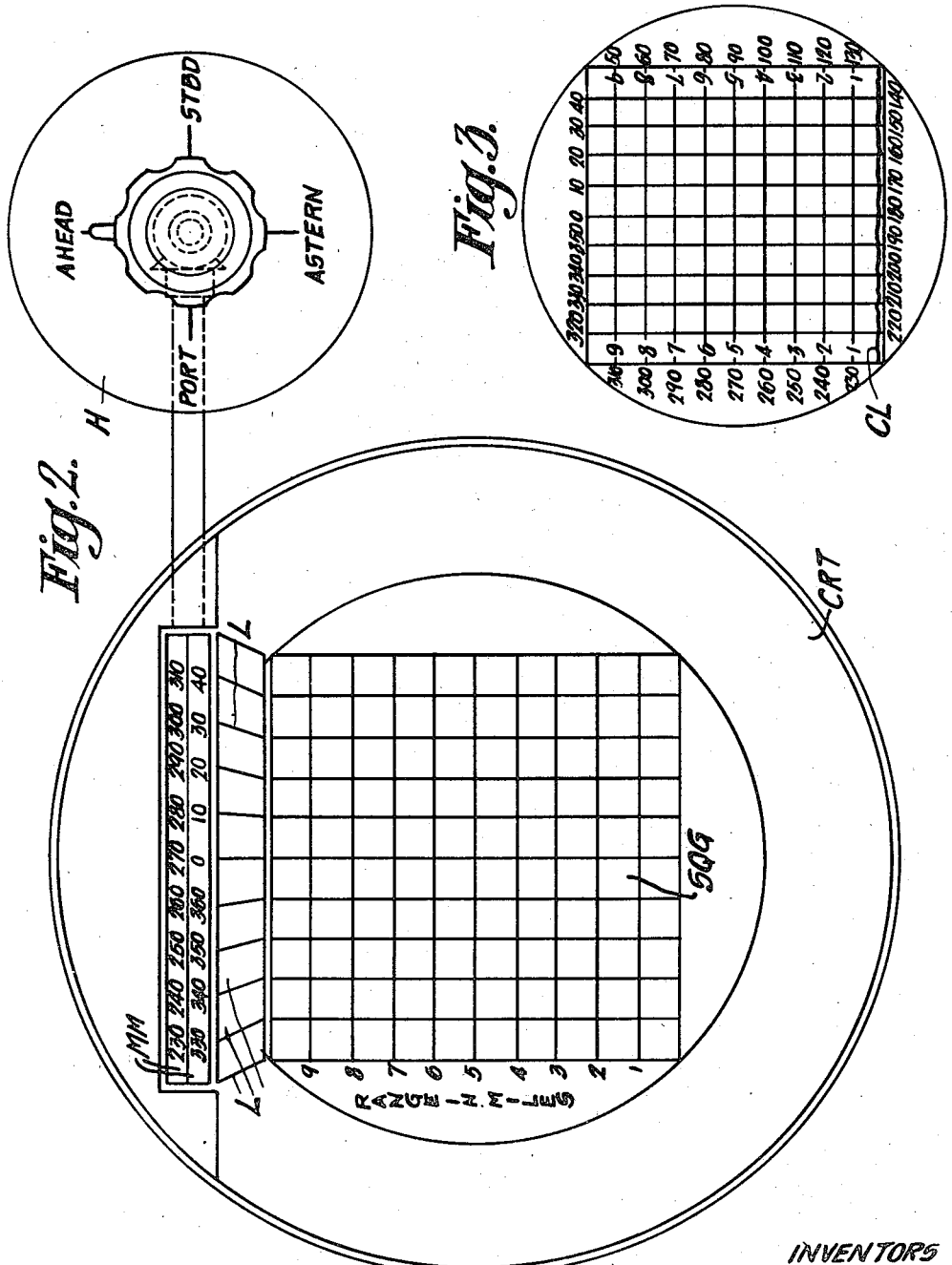

2,563,188

UNITED STATES PATENT OFFICE 2,563,188

RADAR SYSTEM WITH SELECTIVE SECTOR PRESENTATION

Donald Leopold Plaistowe and Roger Prowse Shipway, Chelmsford, England, assignors to Radio Corporation of America, a corporation of Delaware Application November 14, 1947, Serial No. 785,930 In Great Britain November 14, 1946

7 Claims. (Cl. 343—10)

This invention relates to radar systems and has for its object to provide improved, relatively simple and easily serviced radar systems suitable for use for assisting mercantile marine navigation and in particular for harbour approach, and navigation in narrow waters. For such purposes it is required that a radar system should give good discrimination at short ranges and present a "picture" which is easy to read and indicates ranges to a linear or nearly linear scale.

According to this invention a radar system comprises a radar transmitter and co-operating receiver; means for rotating the transmitted radio beam to scan or search a full circle in azimuth; a cathode ray oscilloscope; means for applying to the cathode ray a periodic co-ordinate of deflection, each such deflection occupying a period equal to and corresponding to that taken by the transmitted beam in scanning a predetermined sector of the whole circle of azimuth; means for utilizing received echo signals to provide further control of the cathode ray so that during the time of scanning said sector said oscilloscope presents a "picture" giving information as to the range and the bearing of objects giving rise to the echo signals; and means, operable at will, for changing the sector of the azimuth circle during which the oscilloscope presents a radar "picture."

The information as to the bearing of objects giving rise to echo signals may be given either in the form of information as to relative bearing, i. e. bearing relative to ships head, or in the form of true or compass bearings as may be desired.

Preferably, though not necessarily, the whole arrangement is such that the oscilloscope presents a radar "picture" corresponding to a quadrant, i. e. a quarter of the whole azimuth circle, means being provided to enable this quadrant to be changed at will to any of the four quadrants, ahead, port, starboard or astern. Probably the most convenient arrangement is that in which the ahead quadrant is from four points on the port bow to four points on the starboard bow; the astern quadrant is from four points on the port quarter to four points on the starboard quarter; and the remaining two quadrants are each eight point quadrants, one on each beam, completing the circle of azimuth.

Preferably the oscilloscope is arranged to present a radar "picture" of the so-called B "scan" type, the trace being against a back-ground or scale graticule with two co-ordinates, one of which is indicative of bearing or relative bearing and the other of range. As will be seen later the arrangement is preferably such that a single back-ground scale graticule is utilized for all the quadrants or other sectors.

In the preferred embodiments of the invention the oscilloscope is operated with "blacker than black" as the datum condition and is controlled to be brought up to "black" level only during the sweeping by the radar transmitter of the quadrant of other sector to be "viewed." Preferably means are provided whereby the period per circle of azimuth during which control is effected may be manually controlled so that, in effect, means for effecting scale expansion when desired is provided.

The invention is illustrated in the accompanying drawings in which

Figure 1 is a circuit diagram illustrating one embodiment of the invention, Figure 2 is a view showing one arrangement for presenting the radar display or view, and Figure 3 is a view illustrating another arrangement for presenting the radar display.

Referring to Fig. 1 which shows diagrammatically the main elements of one embodiment the radar installation therein represented comprises a radar transmitter and co-operating radar receiver of any kind known per se. As the transmitter and the receiver proper form no part of the invention they are not shown in Fig. 1 and no description thereof need be given herein. The transmitted radio beam is continuously rotated through a full circle of azimuth, i.·e. the transmitter aerial, wave guide horn, or its equivalent is continuously rotated as in the usual way. Radar presentation is obtained by means of a cathode ray tube which may have either electromagnetic or electro-static deflections but, for simplicity in description, will be assumed to have two pairs of mutual perpendicular deflector plates, namely so-called X plates and so-called Y plates. The tube is represented in figure merely by these plates X1, X2 and Y1, Y2. Deflection of the ray in the X direction, is obtained by means including what is herein termed an azimuth potentiometer generally designated AZ and consisting of a plurality of resistances AZ1, a commutator AZ2, two slip rings AZ3 and AZ4 and three brushes AZ5, AZ6, AZ7 one on each ring and one on the commutator. The resistances are all in series between the two slip rings and each junction point between adjacent resistances is connected to a different commutator segment, adjacent junction points being connected to adjacent segments. The structure comprising commutator, slip rings and resistances is rotated at a speed co-related to the speed or rotation of the transmitter aerial, for example, it may be driven therewith through gearing (not shown). Thus in the present embodiment where there are to be four quadrants to be "viewed" selectively, the commutator is driven at four times the aerial speed. With this arrangement, if a potential is applied between the slip rings and the transmitter aerial is rotated at constant speed the potential between the commutator brush and one of the slip ring brushes will rise in a series of small steps from zero and then return suddenly to zero during each quadrant of aerial rotation. Thus there is produced a voltage of sawtooth wave form. Preferably a reservoir condenser C1 of, for example, 50 mfd. is included in the circuit between the commutator brush AZ7 and earth to smooth out the steps and provide a closer approximation to a smooth linear rise of potential. Relay contacts RC are associated with the lead to brush AZ7 in a manner and for a purpose to be described later herein.

Connection is taken from a point of suitable high potential, e. g. 300 volts, to one brush AZ5 and then from the other brush AZ6 to earth. The lead to brush AZ5 may include a simple smoothing filter F and adjustment resistances R. Suitable positive potential is applied through a suitable resistance AR to the anode of a vacuum tube, for example, a pentode V1, whose cathode is connected to earth and to the suppressor grid and whose control grid is connected through a resistance GR to a tap on a potentiometer P by which adjustable negative grid bias is applied. The screen grid receives suitable fixed potential as shown while the control grid is also connected through resistance R1 and contacts RC to the commutator brush AZ7.

Pentode V1 forms part of what is, in effect, a two-tube paraphase circuit including also a second, symmetrically connected pentode V2. The anode of V1 is connected to one of the X plates X1 of the display cathode ray tube the other X plate X2 being driven in anti-phase by means of the second tube V2 in the paraphase circuit. The Y plates Y1, Y2 of the cathode ray tube are fed with time base deflection voltages (by means not shown) in the usual way and received echo signals are applied (by means not shown), also as in the usual way, to a control electrode of said cathode ray tube to control the intensity of the ray therein.

Driven isochronously with the transmitting aerial or its equivalent is a rotating switch or quadrant contactor generally designated QC having five brushes bearing thereon. This switch is in the form of an insulating drum having let in to its surface a conducting segment QC1 extending over about 90° of the drum periphery. This segment may embrace exactly 90° but is preferably tapered as shown so as to embrace less than 90° at one end and correspondingly more than 90° at the other. The drum has also a continuous slip ring QC2 at one end in conductive connection with the segment at its broad end. One brush QC3 bears on this slip ring and the other four brushes QCF, QCP, QCS and QCA, which are respectively the "forward" or "ahead," "port," "starboard" and "astern" selection brushes are spaced 90° apart and bear on the drum to one side of the slip ring. A point of positive potential is connected through a filter resistance R2 to the slip ring brush QC3 and the other four brushes are connected to one or other of four fixed contacts of a manually operable quadrant selector switch QS whose movable arm QS1 is connected through a relay winding RW to earth. The four contacts of the switch QS for "forward," "port," "starboard" and "astern" are respectively marked QSF, QSP, QSS and QSA. Smoothing condensers may be connected between the rotating switch slip ring brush QC3 and earth and between the movable arm QS1 and earth as required. The normal or datum condition of the display cathode ray tube is "blacker than black" but the tube is arranged in any convenient way to be brought up to "black" by suitable potentials which are applied to the electrodes thereof through circuits (not shown) controlled by contacts RC2 operated by relay winding RW thus allowing received echo signals to "brighten up" the display as in the usual way. The contacts RC already mentioned are also operated by winding RW and serve to prevent the cathode ray spot from scanning at instants other than required to display the intelligence during any one quadrant. The contacts are, as will be seen, so connected that the grid of V1 is connected to brush AZ7 only when winding RW is energized. When RW is de-energized the grid of V1 is disconnected from AZ7 and put to earth thus allowing the cathode ray spot to fall back to its original rest position. In this way break through of unwanted interference during quiescent periods is avoided.

The various circuit values conventionally indicated in Fig. 1 are given by way of example only and the invention is by no means limited to their use.

With the above described arrangement it will be seen that, as the transmitting aerial or its equivalent is rotated, the X plates will be subjected to a saw-tooth deflecting voltage which rises from zero to maximum and then falls sharply to zero four times each azimuth circle, i. e. once each quadrant. By suitably dimensioning the resistance AZ' in the azimuth potentiometer and the reservoir condenser C1 and by providing a sufficient number of resistances AZ1 the deflection which actually occurs in a series of smoothed steps may be made a sufficiently close approximation to a linear saw tooth deflection. For three of the four quadrants the cathode ray tube will not draw out a trace for it is "brightened" only for that quadrant during which the circuit of the relay winding RW is completed through the rotating switch QC and that quadrant may be selected by the manually operable selector switch QS. Preferably the cathode ray tube has sufficient afterglow for the "picture" traced during the selected quadrant to be present during the "dead" quadrants. If the segment QC1 of the switch QC is tapered as shown, the period during which the relay circuit is completed may be adjusted to be more or less than a quadrant by moving the rotating switch drum endwise under the four selection brushes QCF, QCP, QCS and QCA. Also these brushes themselves may be adjustable in position if desired. Provision for "opening up" the scale when required may be made by providing an adjustable resistance instead of a fixed resistance R1 in series with the azimuth potentiometer AZ.

The embodiment of Fig. 1 will give a display in terms of relative bearings. If a display in terms of true bearings is required, for example, where it is required to align the radar "picture" with a chart, this may be obtained by carrying the four selection brushes QCF, QCP, QCS and QCA of the rotating switch RC on a ring carrier which is controlled in position by a gyro compass repeater.

The form of display and the scale against which the trace is read may take any of a variety of forms. In the preferred case described above in which the display is of the so-called B scan type, the cathode ray tube CRT may be provided as shown in Fig. 2 with a squared graticule SQG having one edge marked with a scale of ranges and the other arranged so that the lines which terminate thereon are opposite (or, as shown, extend through eye-leading lines L on to) azimuth scale figures on a face of a rotatable multiscale member MM arranged to be rotated by the same handle H as that used to operate the manual quadrant selector switch QS shown in Fig. 1 so that, when any quadrant is selected for "viewing" the corresponding scale of azimuths—e. g. as illustrated from 315° to 045° in the case of the "ahead" quadrant—appears opposite the edge of the graticule. Alternatively; as shown in Fig. 3, a rotatable graticule marked from 0 to 360° round its periphery—and with two opposite edges marked, in opposite directions and with mutually inverted figures, in ranges, may be employed. This rotating graticule is arranged to be rotated by the manual quadrant selector switch handle which also operates switching means in the tube deflector electrode circuits whereby the entire display is rotated in step with the graticule. With such an arrangement there will not, in practice, be any ambiguity as to which edges of the graticule are the "zero" edges at any time since the normal "clutter" or "ground returns" will indicate the zero axis as in the usual way, by brightening it. Fig. 3 indicates the appearance of the graticule in the "ahead" position, the irregular thick line CL on the edge scale 215—145 indicating the "ground return clutter."

We claim as our invention:

1. A radar system comprising a radar transmitter and a co-operating receiver; means for pulse modulating said transmitter and means for radiating the modulated energy in the form of a directive radio beam; means for rotating the transmitted radio beam to search or scan a full circle in azimuth; a cathode ray oscilloscope, means for producing successively a plurality of like deflecting waves during a full circle rotation of said radio beam with said deflecting waves occurring in synchronism with said beam rotation, each deflecting wave occupying a period equal to and corresponding to that taken by the transmitted beam in scanning a predetermined sector of the whole circle of azimuth; a circuit through which said deflecting waves may be applied to said oscilloscope to deflect the cathode ray thereof along one coordinate; means for deflecting the cathode ray of said oscilloscope along a different co-ordinate which deflection is in synchronism with said pulse modulation, said different co-ordinate being substantially at right angles to said one co-ordinate, means for causing received echo signals to further control the cathode ray to produce an indication whereby the distance of said indication along said other co-ordinate represents the distance to the reflecting object; the distance of said indication along the first co-ordinate representing the bearing of said object; and means, operable at will, for making a selected one of said plurality of deflecting waves effective to deflect said cathode ray along said one co-ordinate and thereby selecting the sector of the azimuth circle during which the oscilloscope presents the radar picture showing said range and bearing.

2. A system as claimed in claim 1 wherein said oscilloscope has a back-ground or scale graticule with two co-ordinates that is utilized for all the quadrants or other sectors, one of said co-ordinates being indicative of bearing or relative bearing and the other of range.

3. A system as claimed in claim 1 wherein there is employed a rotatable member having thereon a graticule marked in azimuth angles round its edges and with two opposite edges also marked in opposite directions in ranges, uni-control means being provided for rotating said member into different positions in correspondence with the selection of the azimuth sector whose picture is presented by the oscilloscope.

4. A system as claimed in claim 1 wherein there is provided a multiscale member and wherein the oscilloscope is provided with a squared graticule having one edge marked with a scale of ranges and the other arranged so that the lines which terminate thereon are substantially opposite azimuth scale figures on a face of said multiscale member, uni-control means being provided for changing the scale of said multiscale member in correspondence with the selection of the azimuth sector whose picture is presented by the oscilloscope.

5. A radar system comprising a radar transmitter and a co-operating receiver; means for pulse modulating said transmitter and means for radiating the modulated energy in the form of a directive radio beam; means for rotating the transmitted radio beam to search or scan a full circle in azimuth; a cathode ray oscilloscope, means for producing successively a plurality of deflecting waves of sawtooth wave form during a full circle rotation of said radio beam with said deflecting waves occurring in synchronism with said beam rotation, each deflecting wave occupying a period equal to and corresponding to that taken by the transmitted beam in scanning a predetermined sector of the whole circle of azimuth; a circuit through which said deflecting waves may be applied to said oscilloscope to deflect the cathode ray thereof along one coordinate; means for deflecting the cathode ray of said oscilloscope along a different co-ordinate which deflection is in synchronism with said pulse modulation, means for causing received echo signals to further control the cathode ray to produce an indication whereby the distance of said indication along said other co-ordinate represents the distance to the reflecting object; the distance of said indication along the first co-ordinate representing the bearing of said object; means, operable at will, for making a selected one of said plurality of deflecting waves effective to deflect said cathode ray along said one co-ordinate and thereby selecting the sector of the azimuth circle during which the oscilloscope presents the radar picture showing said range and bearing.

6. A system as claimed in claim 5 wherein means are provided whereby the angular width of the sector during which control is effected may be manually controlled so that, in effect, means for effecting scale expansion when desired is provided.

7. A radar system comprising a radar transmitter and a co-operating receiver; means for pulse modulating said transmitter and means for radiating the modulated energy in the form of a directive radio beam; means for rotating the transmitted radio beam to search or scan a full circle in azimuth; a cathode ray oscilloscope, means for producing successively a plurality of deflecting waves during a full circle rotation of said radio beam with said deflecting waves occurring in synchronism with said beam rotation, each deflecting wave occupying a period equal to and corresponding to that taken by the transmitted beam in scanning a predetermined sector of the whole circle of azimuth; a circuit through which said deflecting waves may be applied to said oscilloscope to deflect the cathode ray thereof along one co-ordinate; means for deflecting the cathode ray along a different co-ordinate which deflection is in synchronism with said pulse modulation, means for causing received echo signals to further control the cathode ray to produce an indication whereby the distance of said indication along said other co-ordinate represents the distance to the reflecting object; the distance of said indication along the first co-ordinate representing the bearing of said object; said means for producing said plurality of deflecting waves comprising a deflecting voltage source driven with the means for rotating the radio beam and at a speed whose ratio to the speed of said rotation is equal to the ratio of the full circle of azimuth to one sector thereof, and means, operable at will, for making a selected one of said plurality of deflecting waves effective to deflect said cathode ray along said one co-ordinate and thereby selecting the sector of the azimuth circle during which the oscilloscope presents the radar picture showing said range and bearing.

DONALD LEOPOLD PLAISTOWE.
ROGER PROWSE SHIPWAY.

REFERENCES CITED

The following references are of record in the file of this patent:

UNITED STATES PATENTS

| Number | Name | Date |
| --- | --- | --- |
| 2,419,205 | Feldman | Apr. 22, 1947 |
| 2,421,747 | Englehardt | June 10, 1947 |
| 2,422,182 | Bryant | June 17, 1947 |
| 2,422,975 | Nicholson | June 24, 1947 |
| 2,426,189 | Espenschied | Aug. 26, 1947 |
| 2,433,002 | Norton et al. | Dec. 23, 1947 |
| 2,433,804 | Wolff | Dec. 30, 1947 |